May 1, 1923.
W. H. BROWN
LOW PRESSURE ALARM FOR PNEUMATIC TIRES
Filed Aug. 24, 1922
1,453,657
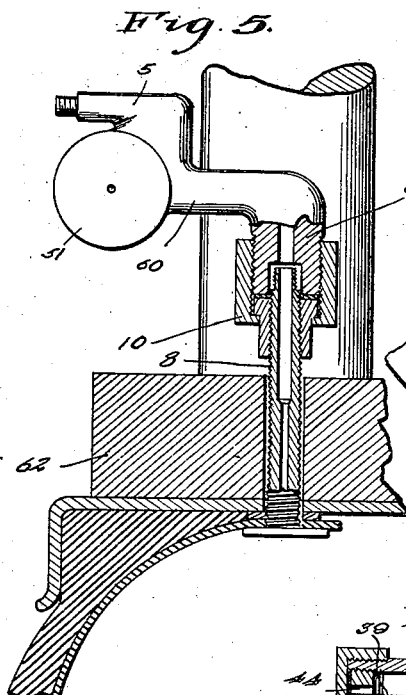
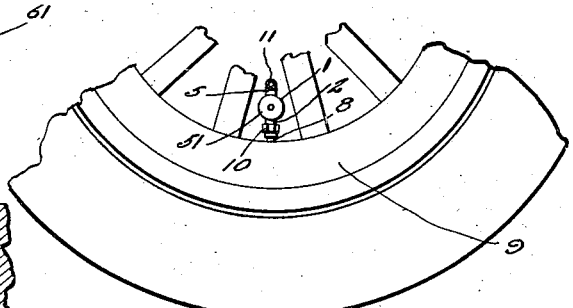
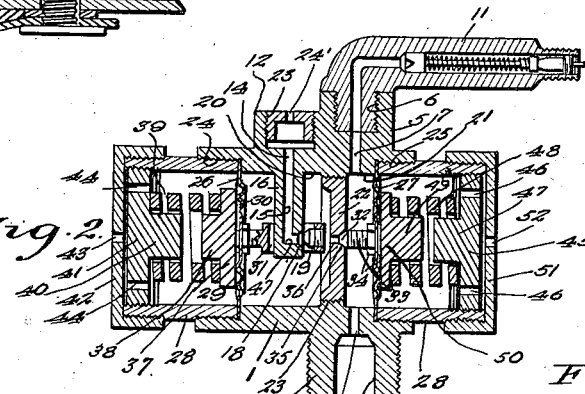
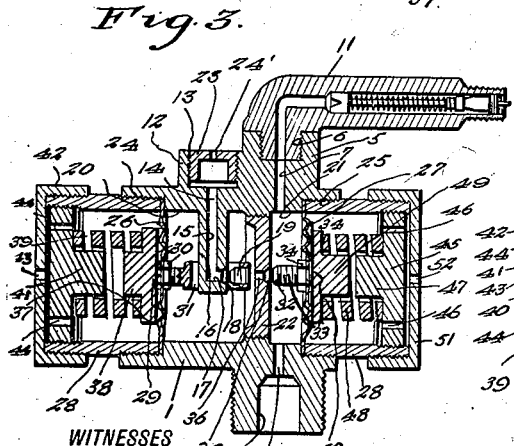
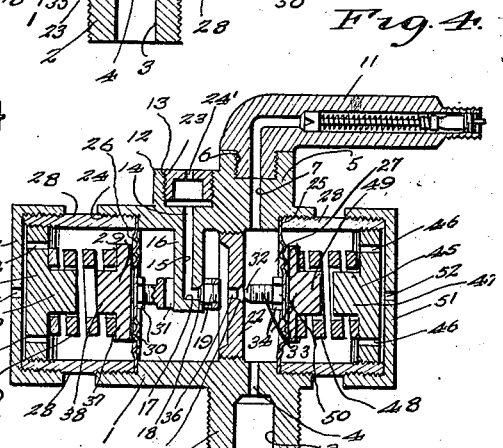
WITNESSES
INVENTOR
Walter H. Brown
BY
ATTORNEYS Patented May 1, 1923.

1,453,657

UNITED STATES PATENT OFFICE.

WALTER HENRY BROWN, OF PASADENA, CALIFORNIA.

LOW-PRESSURE ALARM FOR PNEUMATIC TIRES.

Application filed August 24, 1922. Serial No. 584,132.

*To all whom it may concern:*

Be it known that I, WALTER HENRY BROWN, a citizen of the United States, and resident of Pasadena, in the county of Los Angeles and State of California, have invented certain new and useful Improvements in Low-Pressure Alarms for Pneumatic Tires, of which the following is a specification.

My invention relates to improvements in low pressure alarms for pneumatic tires, and it consists in the combinations, constructions and arrangements herein described and claimed.

The present invention is an improvement on the low pressure alarm for pneumatic tires disclosed in my prior application for Letters Patent of the United States, filed October 25th, 1919, Serial Number 333,163.

In my aforesaid prior application, I disclosed a device attachable to a tire and having means adapted to be actuated by air pressure to cause an audible signal or alarm to be given continuously when a predetermined low pressure has been reached in a tire until a still lower pressure has been reached, and to prevent further escape of air from the tire through the device when the last named or lowest pressure is reached, valves being provided in the device to control the flow of air therethrough.

An object of the present invention is to provide a device of the character described in which means are provided for utilizing to a relatively great degree the air pressure within the device to move and hold the valves supported therein against or away from their seats.

A still further object of the present invention is to provide a device of the character described which comprises positively acting means for controlling the flow of pressure fluid therethrough and means for mounting the device on a vehicle wheel in such manner as to preclude any appreciable effect on the action of the pressure fluid flow controlling means because of centrifugal action set up by the rotation of the wheel.

Other objects and advantages will be apparent from the following description, and the novel features of the invention will be particularly outlined in the appended claims.

My invention is illustrated in the accompanying drawings, forming a part of this application, in which—

Figure 1 is a side elevation showing a practical embodiment of the invention operatively applied to a vehicle wheel, only a fragmentary portion of the latter being shown, Figure 2 is a relatively enlarged longitudinal section through the device detached from the wheel, and illustrating the position of the valve comprised in the device when a predetermined minimum pressure has been reached.

Figure 3 is a view similar to Figure 2 showing the position of the valves when the pressure within the device is between a predetermined low pressure and a predetermined minimum pressure, Figure 4 is a view similar to Figures 2 and 3 showing the position of the valves when the pressure is normal or in other words above the predetermined low pressure, and Figure 5 is a transverse section through a fragmentary portion of a vehicle wheel of a construction different from that illustrated in Figure 1 and through a portion of a modified form of the device, a portion of the modified form of the device being shown in side elevation.

Referring now to the drawings and particularly to Figures 2, 3 and 4 thereof, the present invention contemplates the provision of a substantially cylindrical body 1 having a nipple portion 2 extending laterally therefrom at a point somewhat nearer one end than the other. The bore 3 of the nipple 2 is reduced at 4 to provide an opening or port of restricted area through which the bore of the nipple communicates with the interior of the body 1. A second nipple portion 5 extends laterally from the body 1 in a position corresponding to that of the nipple 2 in so far as its rotation between the ends of the body is concerned, the nipple 5 preferably being diametrically opposite the nipple 2. The nipple 5 has a bore 6 reduced at 7 to provide a port or opening of relatively small area in cross section through which the bore 6 is in communication with the interior of the body. In the construction shown, the openings 7 and 4 are axially aligned with each other.

The nipple 2 is adapted for connection with the usual valve stem of a pneumatic tire. A valve stem is shown in Figure 1 as extending through an opening in the felloe 9 of a wheel upon which the tire provided with the valve stem 8 is mounted and the nipple 2 which in the present instance is provided with external screw threads is connected with the valve stem 8 by the coupling 9 which may be of any suitable or preferred form, such as that illustrated to advantage in Figure 5, whereby the body 1 will be supported between adjacent spokes of the wheel 9 with the longitudinal axis thereof extending in a plane parallel with a plane passing through the outer periphery of the tire on the vehicle at the point of contact of the latter with a surface traversed, or in other words the longitudinal axis of the body 1 will always be horizontally disposed during the rotation of the wheel. The body 1 is illustrated in the drawings as being supported with the longitudinal axis thereof parallel with the axis about which the wheel 9 is adapted to rotate.

The nipple 5 is adapted to threadedly engage the end portion of the casing of the usual Schraeder or like valve 11.

A third nipple or tubular boss 12 extends laterally from the body 1, preferably along the side of the nipple 5 so that the proximate walls of the nipple 5 and the nipple 12 are integral with each other. The bore 13 of the nipple 12 is reduced at 14 so as to be equal in cross sectional area with the bore 15 of a radial inwardly extending valve post 16 which extends from the inner wall of the body 1 in axial alignment with the nipple 12 and has a length slightly greater than that of the radius of the cylindrical chamber or bore of the body 1. The bore 15 is in communication at its inner end with the interior of the body 1 through a lateral opening 17, the walls of which are beveled adjacent to their ends, as indicated at 18 to provide a seat for a valve 19 which is supported for cooperation therewith in a manner which will be hereinafter set forth. The lateral opening or port 17 is concentric with the inner wall of the body 1.

A partition dividing the interior of the body 1 into two chambers, indicated at 20 and 21 respectively, is provided by a disk 22 having threads on its peripheral wall engaged with threads on the inner face of an integral annular enlargement 23 which is formed on the inner wall of the body 1 between the valve post 16 and the opening or port 7 through which the nipple 5 communicates with the body. It will thus be apparent that the nipples 5 and 2 will be in communication with the chamber 21 while the nipple 12 will be in communication through the bore of the valve post 16 and the lateral opening or port with the chamber 20.

A whistle cap 23 having a relatively small central opening or orifice 24 extending through the head thereof is in threaded engagement with the bore 13 of the nipple 12.

The body 1 is provided with counter bores 24 and 25 respectively at the opposite ends thereof and these counter bores are adapted to receive diaphragms 26 and 27 which are releasably held clamped against the inner ends of the counter bores by retaining bushings or rings 28 which are in threaded engagement adjacent to their inner ends with the respective counter bores and extend beyond the opposite ends of the body 1 as shown. The diaphragms 26 and 27 are similar in construction, each having a central opening therethrough and each being formed with a series of concentric annular corrugations therein. A rod 29 extending through the central opening of the diaphragm 26 is secured to the latter intermediate of its length in any suitable manner, as by means of nuts 30 screwed thereon into clamping relation to opposite sides of the diaphragm. The arrangement is such that an air tight connection is provided between the rod 29 and the diaphragm 26 and the end portions of the rod 29 extend laterally of opposite sides of the diaphragm, the rod 29 being held against any appreciable movement independent of the diaphragm. A guide yoke 31 is formed integrally with the rod 29 at the inner end of the latter and is in sliding contact with the lower end portion of the valve post 16.

The yoke or frame 31 carries a valve 19, the arrangement being such that when the rod 29 is moved axially toward the disk 22, the valve 19 will be moved from its seat and when the rod 29 is moved axially in the opposite direction, the valve 19 will be moved against the seat 18 and in position to close the opening 17.

A valve 32 carried at the inner end of a rod 33 extending through the central opening of the diaphragm 27 and being secured to the latter by clamping nuts 34, is adapted to seat in a beveled or enlarged end portion 35 of a central opening through the disk 22.

A disk 37 carried on the outer end portion of the rod 29 is reduced diametrically at 38 to accommodate the one end of a coiled spring 39 which is supported at its other or outer end upon a central boss 40 which extends inwardly from a plug 41 which is screwed into the one retaining bushing or ring 28 and closes the outer end of the latter. A screw cap 42 is fitted upon the end of the bushing 28 in which the plug 41 is disposed. The cap 42 is provided with a central opening 43 and the plug 41 is provided with openings 44 therethrough, whereby communication between the space within the bushing 28 and the atmosphere exteriorly of the cap 42 is provided. The openings 44 are also adapted to be engaged with a suitable wrench, whereby the plug 41 may be adjusted in the retaining bushing.

A plug 45 similar to the plug 41 and being provided with openings 46 therethrough is in threaded engagement with the other retaining bushing or ring 28 adjacent to the outer end of the latter. The plug 45 is formed with a central inwardly extending boss 47 which supports the outer end of a coiled spring 48, the inner end of which is supported upon a reduced end portion 49 of a disk 50 which is in threaded engagement with the outer end portion of the rod 33. A screw cap 51 is fitted upon the outer end portion of the retaining bushing 28 in which the plug 45 is disposed, and has a central orifice 52 therethrough.

From the foregoing description of the various parts of the device, the operation thereof may be readily understood. When it is desired to inflate a deflated tire, to which the nipple 2 is attached, the usual service connection from a source of air pressure is attached to the outer end of the valve 11. The springs 48 and 39 are expansion springs and the valve 32 will thus be held in position to close the opening 36 by the action of the spring 48 at the beginning of the operation of inflating the tire. In consequence, air entering the chamber 20 will pass through the nipple 2 into the tire. As pressure builds up within the tire and within the chamber 21, the diaphragm 2 will be flexed outward and the valve 32 will be opened against the action of the spring 48. If, at this time, the orifice 24 through the whistle cap 23 is closed, as by being covered by the finger of a hand, pressure will build up within the chamber 20 until the diaphragm 26 is actuated to cause the closing of the valve 19 against the action of the spring 39. In Figure 4, the valves 32 and 19 are shown in the positions which they will assume when normal working pressure is maintained within a tire to which attached. It is to be understood that the usual valve connection of the valve stem of the tire has been removed before the device is attached thereto.

For convenience in explaining the operation of the device, it will be assumed that the normal working pressure of a tire to which the device is attached is approximately 60 lbs. per square inch and that a warning is desired, if because of puncture, slow leak or other cause the pressure drops to 50 lbs. per square inch. The spring 39 is adjusted so that it will elongate or expand when the air pressure against the diaphragm 26 has dropped to 50 lbs. As the diaphragm 26 is flexed under the pressure applied thereto by the expanding spring, the valve 19 is moved to open position, as illustrated in Figure 3, and air is permitted to pass through the bore 15 of the valve post into and through the orifice of the whistle cap 23, thereby causing a whistling sound which gives warning to the operator that the pressure within the tire is 50 lbs. per square inch or less. The warning is given continuously until the pressure within the tire has reached a still lower or minimum pressure, which is assumed to be 40 lbs. per square inch. At that time, the spring 48 will expand and will flex the diaphragm 27 thereby moving the valve 32 to closed position and thus preventing the further escape of air from the tire through the body. The springs 48 and 39 may be adjusted through the agency of the adjusting plugs 45 and 51 to expand against predetermined air pressures, the figures 50 lbs. and 40 lbs. recited herein being only illustrative and not restrictive. The diaphragm construction comprised in the device for operating the valves in conjunction with the springs insures positive actuation of the valves which are held more securely in desired positions because of given air pressures than is possible when springs alone are employed to effect movement of the valves from open to closed position, and vice versa. Moreover, a valve operating arrangement including a diaphragm, such as illustrated and described, will effect movement of the valve with greater uniformity throughout an extended period of service than is possible with a valve operating construction in which the diaphragm is omitted. The diaphragms comprised in the device have concentric annular corrugations therein so that relatively great flexure is possible when a diaphragm of a given size is employed.

It is to be observed at this point that both the valves 19 and 32 move to their closing positions in the direction of currents of escaping pressure fluid. That is to say, the pressure from a source of pressure to which the device is applied tends to hold the valves in closed positions. In consequence, the pressure against the valves themselves tends to aid the means provided by my invention and hereinbefore described for moving and holding the valves against their seats.

It is also to be observed that the disk 37 and the diaphragm 26 and the disk 50 and the diaphragm 27 are relatively arranged so that the disk 37 serves to reenforce or support the flexed diaphragm 26, particularly after the valve 19 has been moved to closed position in such manner as to preclude over deflection or undue strain of the diaphragm 26, and the disk 50 performs a like function in respect to the diaphragm 27.

The bosses 49 and 47 are axially alined and in confronting relation in respect to each other. These bosses constitute cooperative stop members which contact each other when the rod 33 has been moved axially a determined distance because of pressure on the diaphragm 27 to prevent over travel of the rod 33.

In Figure 5 the nipple portion 2 of the form of the device heretofore described is replaced by a nipple portion 60 which extends substantially at right angles to the nipple 5 and is relatively long, being bent laterally at a determined distance from its extremity to provide an attaching portion 61 which is adapted for attachment through the agency of the coupling 10 with the valve stem of a tire mounted upon a wheel 62. The wheel 62 represents any wheel, the spokes or web portion of which is constructed in such manner as to preclude the positioning of the body in the position in which illustrated in Figure 1. For example, the wheel 62 may be of the disc-wheel type of construction. In either case, the body of the device is positioned so that the aligned axes of the springs 39 and 48 lie in a plane parallel with a plane passing through the peripheral portion of the tire on the wheel which is in contact with a surface traversed. The axes of the springs 39 and 48 are horizontally disposed and any interference with the performance by the springs of the functions for which they are provided, as hereinbefore described, which might be occasioned by centrifugal action set up by the rotation of the wheel to which the device is applied, is obviated.

Obviously, my invention is susceptible of embodiment in forms other than that illustrated in the accompanying drawings and I therefore consider as my own all modifications of the form of the device herein disclosed which fairly fall within the scope of the appended claims.

I claim:—

1. In a low pressure alarm, a casing attachable to a source of pressure, and provided with an outlet, a valve disposed within the casing for controlling communication between the source of pressure and the outlet, a spring reacting against the valve to tend to hold the latter in open position, a diaphragm supported within the casing and connected with the valve to move the latter to closed position when the diaphragm is actuated by definite fluid pressure, a second valve disposed within the casing and controlling communication between the first valve and the source of pressure, and means for operating the second valve.

2. In a low pressure alarm, a casing attachable to a source of pressure, and being provided with an outlet, a valve disposed within the casing for controlling communication between the source of pressure and the outlet, a spring reacting against the valve to tend to hold the latter in open position, a diaphragm supported within the casing and connected with the valve to move the latter to closed position when the diaphragm is actuated by definite fluid pressure, a second valve disposed within the casing and controlling communication between the first valve and the source of pressure, a spring reacting against the second valve tending to hold it in closed position, and a second diaphragm supported within the casing and connected with the second valve for moving the latter to open position when the second named diaphragm is actuated by a definite fluid pressure.

3. A device of the character described comprising a casing attachable to a source of pressure and provided with an outlet, a valve disposed within the casing for controlling communication between the source of pressure and the outlet, a spring reacting against the valve to tend to hold the latter in open position, a diaphragm supported within the casing and connected with the valve to move the latter to closed position when the diaphragm is actuated by a definite fluid pressure, and differential means disposed within the casing for controlling communication between said valve and the outlet.

WALTER HENRY BROWN.